Patented Dec. 14, 1948

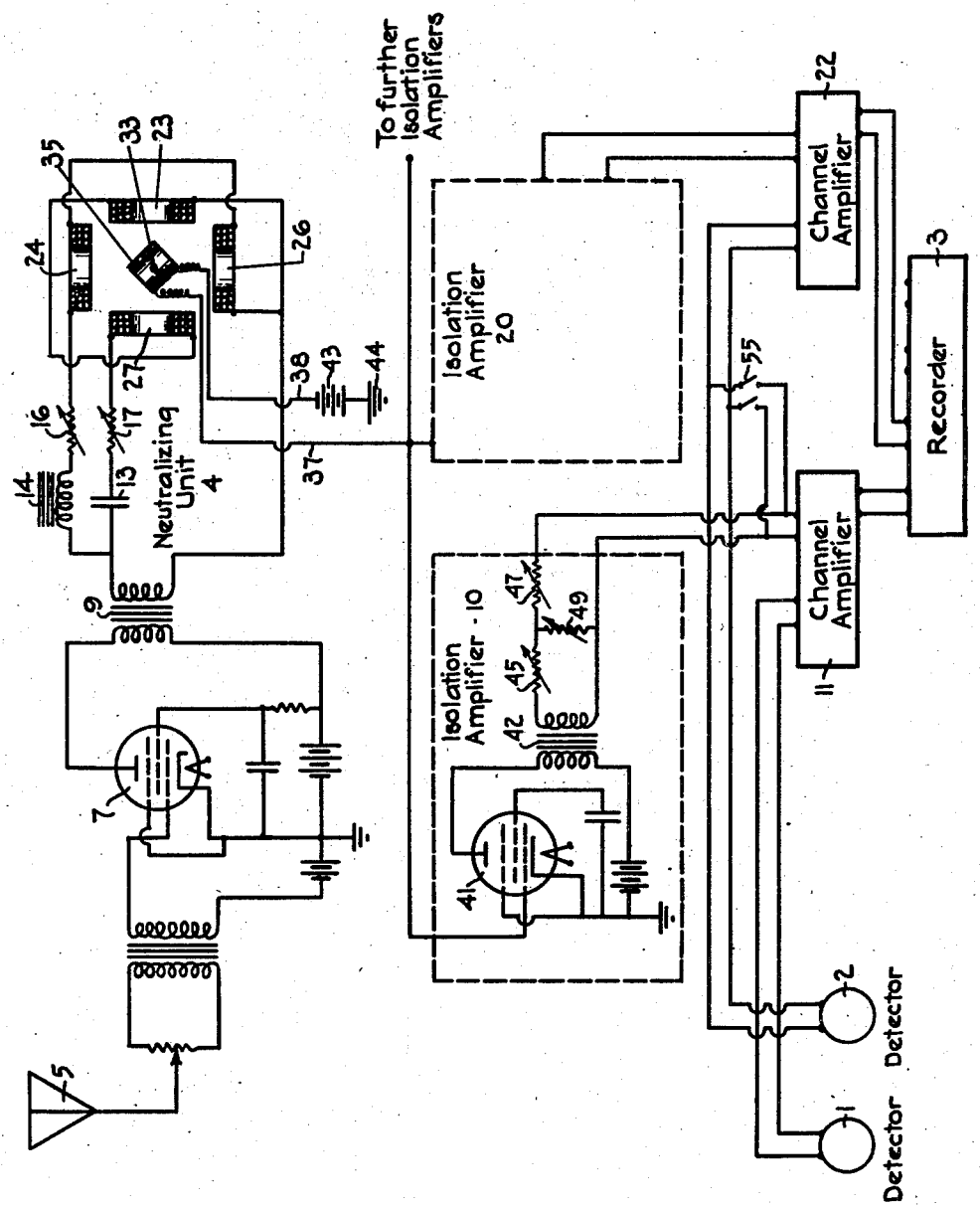
Inventor: Ronald P. Gilmore
By his Attorney:

2,456,401

UNITED STATES PATENT OFFICE 2,456,401

INTERFERENCE ELIMINATOR FOR SEISMIC RECORDING SYSTEMS

Ronald P. Gilmore, Fulton, Mo., assignor to Shell Development Company, San Francisco, Calif., a corporation of Delaware Application September 24, 1945, Serial No. 618,166

3 Claims. (Cl. 177—352)

This invention pertains to seismic exploration, and relates more particularly to a system for balancing out or neutralizing the effect of stray external alternating current fields on the operation of seismic circuits.

Seismic exploration normally comprises the steps of generating seismic waves in the ground, translating these seismic waves into electrical impulses at a plurality of detectors or seismometers placed in contact with the ground, transmitting the electrical impulses with suitable amplification to a recording seismograph, and recording these electrical impulses.

Since the motions of the ground which are to be recorded are extremely small, the voltages produced by the detectors in response thereto are likewise very small. When seismic exploration is undertaken in the vicinity of installations involving the use of alternating currents, such as power lines, electric railways, generator stations, etc., it has been often observed that the oscillating magnetic fields surrounding these installations are sufficiently strong to induce spurious voltages in various conductors and circuits forming part of the seismograph system, such as the field coils of electro-magnetic detectors, the leads from the detectors to the recorder, the various circuits of the amplifier and recorder units, etc., thus obscuring or disfiguring the true indications of the recorders.

It is therefore an object of this invention to provide a method and a system for eliminating the interfering effects or signals induced in a seismic recording system by the oscillations of an outside magnetic field.

It is also an object of the present invention to provide for this purpose a system wherein the disturbing magnetic oscillations are detected and translated into a neutralizing alternating current having its phase adjusted so as to be exactly opposite to that of the interfering currents or signals induced in the seismic recording system by said magnetic oscillations, said neutralizing current being then introduced into the seismic system to neutralize said interfering signals.

These and other objects of the present invention will be understood from the following description taken with reference to the attached drawing, giving a diagram of the circuits of the present system.

Referring to the drawing, the present invention is described in its application to a conventional seismic exploration system. Such system may comprise any desired number of detectors, of which only detectors 1 and 2 are shown for simplicity. Detectors 1 and 2 are connected, through channel amplifiers 11 and 22 respectively, to recording galvanometers placed within a recorder 3, each detector, amplifier and galvanometer together with their interconnecting circuits forming a recording channel. When such a system is operated in an alternating or oscillating magnetic field which tends to induce therein currents or signals obscuring the true indications of the detectors, the effects of this outside field are neutralized according to the present invention in the following manner. A suitable conductor, such as an antenna 5, which may be mounted on the seismic truck, is used, in combination with electronic circuit means comprising, for example, a tube 7, to convert the interfering magnetic oscillations, into an alternating current which is transmitted, if desired, with suitable further amplification, through a transformer 9, to the balancing or neutralizing unit 4. This unit comprises two circuits either independent or connected in parallel to the secondary winding of the transformer 9, as shown in the drawing. The first circuit or branch may comprise an inductive reactance such as a coil 14 in series with a resistance 16 and with a set of Helmholtz coils 24 and 26. The second branch may comprise a capacitive reactance, such as a condenser 13 in series with a resistance 17 and with a set of Helmholtz coils 23 and 27 fixedly mounted about an axis located in the same plane as the axis of the coils 24 and 26 and at right angles thereto. The field of the coils 24 and 26 is thus normal to and intersects with that of coils 23 and 27. Rotatably arranged about a shaft 33 in this combined Helmholtz field is a test coil 35.

The inductive reactance of the circuit comprising coils 14, 24 and 26 is selected so as to have a value equal to that of its ohmic resistance at the frequency of the interfering oscillations, which is usually 60 cycles, while the value of the net capacitive reactance of the circuit comprising condenser 13 and coils 23 and 27 is selected in the same manner with regard to its ohmic resistance. The values of the variable resistances 16 and 17 being preferably made equal, the currents in the circuits of the coil 14 and of the condenser 13, and therefore the fields of the Helmholtz coils 24—26 and 23—27, may therefore be made to differ in phase from each other substantially by 90 degrees, the coils 24—26 being furthermore displaced in space by 90 degrees with regard to coils 23—26.

Under these conditions, if the inductive reactance in one circuit is numerically equal to the capacitive reactance of the other and each of these is numerically equal to the series resistance, the currents in the two circuits will be exactly 90 degrees out of phase. When this condition is satisfied, the resultant magnetic field produced by the sets of the Helmholtz coils will be constant in magnitude and will revolve with an angular velocity of 60 revolutions per second. This revolving field will produce a 60-cycle voltage in the test coil 35 whose phase will depend only upon the angle of orientation of the coil. By a proper adjustment of this angle, the voltage from the test coil can be set exactly 180 degrees out of phase with any given 60-cycle disturbance, thus obtaining from said coil a neutralizing or balancing signal.

The coil 35 is connected, through leads 37 and 38, one of which may be grounded as shown at 44 through a battery 43 to the input of as many isolation amplifiers, such as shown at 10 and 20, as there are channels in the system. The isolation amplifier 10 comprises at least one amplifying thermionic tube 41, whose output is applied, for example through a transformer 42, to the channel amplifier 11.

The sequence of operations of the present system may therefore be summarized as follows for each channel. The oscillations of an outside magnetic field, caused, for example, by an adjacent power line, induce in the circuits and conductors of seismic recording system an interfering signal tending to obscure the true response of the detector to seismic waves. These outside oscillations are also picked up and converted by the elements 5, 7 and 4 of the present system into neutralizing signals of inverted phase, which are amplified by the element 10, and introduced or applied to the channel or channel amplifier 11 to cancel the effect of the spurious or interfering signal, whereby the output of the channel amplifier 11 may be recorded in an undistorted form by the recorder 3.

A suitable filter or resistance network may be provided in each channel to adjust the intensity of the neutralizing signal to that of the interfering spurious signal in that particular channel. This may be effected for example by means of variable resistances 45, 47 and 49 connected as a T-network in the leads between the isolation amplifier 10 and the channel amplifier 11.

If desired, a single isolation amplifier may be used to convey a neutralizing signal to all the channels of a seismic recording system. For this purpose, isolation amplifier 20 and any further isolation amplifiers may be omitted, and the output of the isolation amplifier 10 may be connected to the channel of detector 2 by closing a switch 55, a similar switch being used for all other channels, if any, of the seismic system. It is further obvious that instead of using a single neutralizing unit to produce an inverse phase neutralizing signal for all the channels of the seismic system, a separate neutralizing unit may be used for each of the channels of said system, which can be effected, for example, by providing the transformer 9 with a plurality of secondary windings or by using a plurality of such transformers.

I claim as my invention:

1. In a system for neutralizing interfering signals induced in a seismic recording network by outside magnetic field oscillations, electronic circuit means for converting said oscillations into an alternating current, means for passing a portion of this current through a circuit comprising in series a set of Helmholtz coils and an inductive reactance, means for passing another portion of this current through a second circuit comprising in series a set of Helmholtz coils and a capacitive reactance, said sets of Helmholtz coils being arranged so that their magnetic fields intersect at right angles, a coil rotatably positioned at the intersection of said magnetic fields, means for adjusting the phase of the current induced in said coil when said alternating current is passed through said Helmholtz coil circuits, means for amplifying said induced current, and means for introducing said amplified current into said seismic recording network to neutralize said interfering signals.

2. In a system for neutralizing interfering signals induced by outside magnetic field oscillations in a seismic recording system comprising a plurality of channels, electronic circuit means for converting said oscillations into an alternating current, means for amplifying said alternating current, means for passing a portion of said current through a circuit comprising in series an inductive resistance and a set of Helmholtz coils, means for passing another portion of said current through a second circuit comprising a capacitive reactance and a set of Helmholtz coils, said sets of Helmholtz coils being arranged so that their magnetic fields intersect at right angles, a coil rotatably positioned at the intersection of said magnetic fields, means for adjusting the phase of the current induced in said coil when said alternating current is passed through said Helmholtz coil circuits, amplifying means connecting said rotatable coil in parallel to each of the channels of the seismic recording system, and means for adjusting the intensity of the amplified current delivered by said amplifying means to each of said channels.

3. In a system for neutralizing interfering signals induced in a seismic recording network by outside magnetic field oscillations, means independent of said network for picking up said oscillations, means for converting said oscillations into an alternating current, a first circuit comprising a set of Helmholtz coils energized by said alternating current, a second circuit comprising a set of Helmholtz coils energized by said alternating current, said sets of Helmholtz coils being positioned so that their magnetic fields intersect at right angles, means in circuit with said Helmholtz coils to put the energizing current flowing in the first set of said coils in quadrature phase relation with the current flowing in the second set of said coils, a coil rotatably positioned at the intersection of the magnetic fields of said Helmholtz coils, means for adjusting the phase of the current induced in said rotatable coil by the energizing current flowing through said Helmholtz coils, means for amplifying said induced current, and means for introducing said amplified current into said seismic recording network to neutralize the effect of said interfering outside field oscillations.

RONALD P. GILMORE.

REFERENCES CITED

The following references are of record in the file of this patent:

UNITED STATES PATENTS

| Number | Name | Date |
|---|---|---|
| 1,543,668 | Gewecke | June 30, 1925 |
| 1,544,622 | Affel | July 7, 1925 |
| 1,630,346 | Latour | May 31, 1927 |
| 2,161,418 | Jones | June 6, 1939 |
| 2,164,196 | Woodyard et al. | June 27, 1939 |
| 2,263,519 | Ritzmann | Nov. 18, 1941 |
| 2,294,627 | Parr | Sept. 1, 1942 |
| 2,296,754 | Wolf et al. | Sept. 22, 1942 |
| 2,438,217 | Johnson | Mar. 23, 1948 |

FOREIGN PATENTS

| Number | Country | Date |
|---|---|---|
| 427,796 | Great Britain | Apr. 26, 1935 |